United States Patent [19]

Yoshikawa

[11] Patent Number: 5,790,105
[45] Date of Patent: Aug. 4, 1998

[54] PRESSURE SENSITIVE RESISTOR TABLET COORDINATE INPUT DEVICE

[75] Inventor: Osamu Yoshikawa, Tokyo, Japan

[73] Assignee: SMK Corporation, Tokyo, Japan

[21] Appl. No.: 838,786

[22] Filed: Apr. 10, 1997

[30] Foreign Application Priority Data

Apr. 12, 1996 [JP] Japan ................................. 8-114408

[51] Int. Cl.$^6$ ................................................ G09G 5/00
[52] U.S. Cl. .......................... 345/173; 345/174; 345/179; 345/156; 345/157; 178/18; 178/19
[58] Field of Search ........................ 345/179, 174, 345/173, 156, 157; 178/18, 19

[56] References Cited

U.S. PATENT DOCUMENTS

| | | | |
|---|---|---|---|
| 4,638,119 | 1/1987 | Blesser et al. | 178/19 |
| 5,327,161 | 7/1994 | Logan et al. | 345/157 |
| 5,343,220 | 8/1994 | Veasy et al. | 345/199 |
| 5,428,367 | 6/1995 | Mikan | 345/157 |
| 5,670,755 | 9/1997 | Kwon | 178/19 |

*Primary Examiner*—Jeffery Hofsass
*Assistant Examiner*—Ashok Mannava
*Attorney, Agent, or Firm*—Armstrong, Westerman Hattori, McLeland & Naughton

[57] ABSTRACT

A pressure sensitive resistance tablet coordinate input device is provided which enables the cursor to be moved to a desired position on a PC display by pressing a tablet sheet (6) with a stylus, permits the stylus press-shift operation at the center of the tablet sheet (6) and maintains the continuity of control of the cursor movement even if the pressure to the tablet is once removed. The device is selectively switchable between an absolute value output data in which pressed-position data $(x_n, y_n)$ is used as cursor control data $(X_n, Y_n)$ or a relative value output mode in which relative position data is calculated by comparing pieces of pressed-position data before and after the stylus press-shift operation on the tablet sheet (6). The relative position data thus calculated is used as the cursor control data $(X_n, Y_n)$. Since either one of the two modes of operation can be selected in accordance with the contact resistance value $r_P$ at the position of the tablet being pressed, it is possible to control the cursor movement corresponding to the operation, only by changing the method for pressing the tablet sheet (6).

7 Claims, 6 Drawing Sheets

1

PRESSURE SENSITIVE RESISTOR TABLET COORDINATE INPUT DEVICE

BACKGROUND OF THE INVENTION

1. Field of the Invention

The present invention relates to a pressure sensitive resistor tablet coordinate input device which controls the movement of a cursor on the display screen of a personal computer in accordance with the position on a tablet sheet where the pressure sensitive resistor tablet coordinate input device is being pressed.

2. Description of the Prior Art

With recent developments in GUI (Graphical User Interface) environments, a mouse has come into wide use as a coordinate input device for personal computers (hereinafter referred to simply as PCs).

That is, the mouse is dragged on an operation pad and relative output data $(X'_n, Y'_n)$ is generated from relative position data $(x_n - x_{n-1}, y_n - y_{n-1})$ representing the distance dragged and is fed to a PC. A device driver of the PC adds the relative output data $(X'_n, Y'_n)$ input thereto via an input/output or I/O port from the mouse to cursor control data $(CX_{n-1}, CY_{n-1})$ having represented so far the absolute position of the cursor on the PC screen to generate new cursor control data $(CX_n, CY_n)$, and controlling the cursor to move to the position on the PC screen indicated by the new cursor control data $(CX_n, CY_n)$. A user moves the cursor to the icon on the screen while at the same time manipulating a mouse switch to input into the PC an instruction specified by the icon.

Since the mouse needs to be dragged on the operation pad as mentioned above, portable PCs of the type which have no mouse manipulating space, usually employ, as a substitute for the mouse, such a low-profile pressure sensitive resistor tablet coordinate input device 107 as shown in FIG. 8 which has a tablet sheet 6 as an input surface.

The pressure sensitive resistor tablet coordinate input device 107 detects the position of pressure applied to the tablet sheet 6 in the same way as position detecting facilities used in a known resistance contact type tablet or similar. When moving a finger or stylus on the tablet sheet while pressing the finger or stylus, tablet-pressed-position data $(x_n, y_n)$, indicating the position of the pressure applied to the tablet sheet 6, is detected upon each detection of the tablet-pressed position. The pressure sensitive resistor tablet coordinate input device 107 provides the tablet-pressed-position data $(x_n, x_y)$ as absolute output data $(X_n, Y_n)$ to a PC 1. As referred to above, a device driver 3 of the PC 1 uses the absolute output data $(X_n, Y_n)$ input thereto via an I/O port 4 as the cursor control data $(CX_n, CY_n)$ indicating the absolute position of the cursor on a display 5, and controlling the cursor to move to the position on the display 5 expressed by the cursor control data $(CX_n, CY_n)$ as is the case with the mouse 2.

Thus, by shifting the position of the pressure applied to the tablet sheet 6, the cursor movement can be controlled in the same manner as in the case of using the mouse.

As referred to above, the conventional mouse requires space for manipulation thereof. Further, the relative output data $(X'_n, Y'_n)$ representing the distance over which the mouse is being dragged is fed to the PC, so that when the position (O) of the cursor and the position (A) of the icon are spaced apart from each other on the display 5 of the PC 1 as depicted in FIG. 7, the relative position data $(x_n - x_{n-1}, y_n - y_{n-1})$ must be provided again and again to move the cursor to the position (A) of the icon. Hence, the mouse 2 needs to be dragged by a distance corresponding to that from the position (O) to (A).

Moreover, since the relative output data $(X'_n, Y'_n)$ is always provided during the dragging of the mouse 2, the cursor movement leaves a continuous or uninterrupted locus. This is not suitable for a character input in character recognition, for instance. That is, as shown in FIG. 7, in the case of drawing a Japanese character "り" on the display 5, it is necessary that the locus of the cursor moved to a position A, needs to start again at a position B. Should the mouse 2 be moved in position from A' to B' on the operation pad, the locus of the cursor movement is also drawn between the positions A and B on the display screen 5 as shown and is indistinguishable from the locus between the positions O and A. For this reason, the locus of the cursor movement between the points A and B must be cancelled. This requires another switch input to discriminate the manipulation for the unnecessary cursor movement from the normal manipulation.

In the conventional pressure sensitive resistor tablet coordinate input device 107, the tablet-pressed position $(x_n, y_n)$ is used as the absolute position to create the cursor control data $(X_n, Y_n)$. Hence, as shown in FIG. 8, when pressing the tablet sheet 6 at the position (C') corresponding to the icon on the display screen 5, the cursor will immediately move to the position (C) corresponding to the tablet-pressed position; thus, the cursor can be controlled to move to a desired position by outputting the tablet-pressed-position data $(x_n, y_n)$ only once. Also in the above-mentioned character input, it is possible to form spaced-apart loci of cursor movements by stopping the pressing of the tablet sheet 6 at one position and then resuming it at a different position.

Yet the conventional pressure sensitive resistor tablet coordinate input device 107 has the following disadvantages. First, the tablet sheet 6 always needs to be pressed at the position corresponding to that of the cursor on the display, so that in the case of moving the cursor from a position (C) to (D), for instance, on the display as shown in FIG. 8, it is necessary to move, for example, a stylus from a position (C') to (D') in a narrow area at the upper right corner of the tablet sheet 6 while pressing the stylus thereto. Combined with the narrow operation area of the tablet sheet 6, it is cumbersome to press the tablet sheet 6.

Second, in the case of inputting, for example, a pattern by loci of cursor movements, it is hard to resume pressing the tablet sheet 6 at the position where the previous pressing was discontinued. Accordingly, in the case of drawing a graphic form or similar by loci of cursor movements, there is a strong possibility that the operation cannot be performed continuously and must be started over again.

SUMMARY OF THE INVENTION

It is therefore an object of the present invention to provide a pressure sensitive resistor tablet coordinate input device which permits cursor movement to a desired position on the display by one press on the tablet sheet, enables the stylus press-shift operation on the tablet sheet to be done at the center thereof and retains the continuity of the cursor movement control even if the pressing of the tablet sheet is temporarily stopped.

According to a first aspect of the present invention, there is provided a pressure sensitive resistor tablet coordinate input device which includes: a tablet sheet; stylus pressure detecting facilities for detecting the application of stylus pressure to the tablet sheet; position detecting facilities for generating pressed-position data $(x_n, y_n)$ indicating the position on the tablet sheet where it is being pressed; storage facilities for storing the pressed-position data $(x_n, y_n)$ at least until the next tablet-pressed-position data is generated; output data generating facilities for generating, from the pressed-position data $(x_n, y_n)$, absolute output data $(X_n, Y_n)$ for controlling the cursor movement; and data output facilities for outputting the absolute output data $(X_n, Y_n)$ to a personal computer. The coordinate input device controls the cursor movement on the PC display in response to the tablet sheet pressing operation.

The output data generating facilities can selectively be put in: an absolute value output mode in which to use the tablet-pressed-position data $(x_n, y_n)$ as the absolute output data $(X_n, Y_n)$; and an relative value output mode in which to use the absolute output data $(X_n, Y_n)$ obtained by adding immediately preceding absolute output data $(X_{n-1}, Y_{n-1})$ with relative position data $(x_n - x_{n-1}, y_n - y_{n-1})$ indicative of the relative stylus shift amount on the tablet sheet before and after the current press-shift operation. In either one of the two output modes selected in accordance with the contact resistance value $r_P$ at the position on the tablet sheet where it is being pressed, the output data generating facilities generates the absolute output data.

When the absolute output mode is selected according to the contact resistance value $r_P$ at the position on the tablet sheet where it is being pressed, the absolute output data generated using the pressed-position data intact is fed to the personal computer. When the contact resistance value $r_P$ differs from that selecting the absolute value output mode and the relative value output mode is selected, the absolute output data, composed of the immediately preceding absolute output data and the relative position data representing the relative stylus shift amount on the tablet sheet before and after the current press-shift operation, is fed to the personal computer.

Hence, the absolute output data in the absolute value output mode and the absolute output data in the relative value output mode can freely be provided, by changing the contact resistance value $r_P$, to the personal computer which moves the cursor by the input thereto of the absolute output data. In the absolute value output mode, the cursor can be moved to a desired position on the display by one operation, besides loci of the cursor movements can be formed at spaced-apart positions. In the relative value output mode, the stylus press-shift operation can be performed at an arbitrary position on the tablet sheet and the amount of distance moved on the tablet sheet without pressing it is not included in the relative position data, so that even if the pressure applied to the tablet sheet is removed during the press-shift operation, continuity will not be destroyed.

According to a second aspect of the present invention, there is provided a pressure sensitive resistor tablet coordinate input device which includes: a tablet sheet; stylus pressure detecting facilities for detecting the application of pressure to the tablet sheet; position detecting facilities for generating pressed-position data $(x_n, y_n)$ indicating the position on the tablet sheet where the stylus pressure applied thereto; storage facilities for storing the tablet-pressed-position data $(x_n, y_n)$ at least until the next pressed-position data is generated; output data generating facilities for computing relative position data $(x_n - x_{n-1}, y_n - y_{n-1})$ by comparing pieces of pressed-position data before and after the current one and for generating, from the relative position data $(x_n - x_{n-1}, y_n - y_{n-1})$, relative output data $(X'_n, Y'_n)$ for controlling the cursor movement; and data output facilities for outputting the relative output data $(X'_n, Y'_n)$ to a personal computer. The coordinate input device controls the cursor movement on the PC display in response to the tablet sheet pressing operation.

When the pressure applied to the tablet sheet is detected again after the pressure was once removed, the output data generating facilities can selectively put in: an absolute value output mode in which it computes the relative position data $(x_n - x_{n-1}, y_n - y_{n-1})$ by comparing the data $(x_{n-1}, y_{n-1})$ on the position where the pressure to the tablet sheet was removed and the data $(x_n, y_n)$ on the position where the pressure to the tablet sheet was detected again and generates the relative output data $(X'_n, Y'_n)$ from the thus computed relative position data $(x_n - x_{n-1}, y_n - y_{n-1})$; and a relative value output mode in which it nullifies the data $(x_{n-1}, y_{n-1})$ on the position of the tablet sheet where the pressure was removed therefrom and does not generate the relative output data $(X'_n, Y'_n)$. In either one of the two output modes selected in accordance with the contact resistance value $r_P$ at the tablet-pressed position, the output data generating facilities generates the relative output data.

When the absolute value output mode is selected according to the contact resistance value $r_P$ at the pressed position, relative output data is generated from the relative position data which represents the relative stylus shift amount from the position on the tablet sheet where the pressure was removed therefrom to the position on the tablet sheet where it was pressed again, and such relative output data is fed to the personal computer. When the contact resistance value $r_P$ is a value different from the value accorded by the selection of the absolute value output mode, the relative value output mode is selected and no relative output data is created upon detection of the application of the pressure to the tablet sheet.

Hence, the absolute output data in the absolute value output mode and the absolute output data in the relative value output mode can freely be fed, by changing the contact resistance value $r_P$, to the personal computer which moves the cursor by the input thereto of the absolute output data. In the absolute value output mode, the relative output data is provided which is based on the relative stylus shift amount on the tablet sheet after the removal therefrom of the stylus pressure, so that the cursor can be moved to a desired position on the display by one operation. Besides, loci of the cursor movements can be formed at spaced-apart positions by making provision to generate the loci only while detecting the application of the stylus pressure to the tablet sheet. In the relative value output mode, when the application of the pressure to the tablet sheet is detected, no relative output data is generated. Hence, even if the pressure applied to the tablet sheet is temporarily removed during the press-shift operation, the cursor movement can be controlled continuously.

According to a third aspect of the present invention, the mode of operation for the output data generating facilities is chosen by discriminating between a contact resistance value $r_{1P}$ by pressing the tablet sheet with a stylus and a contact resistance value $r_{2P}$ by pressing with a finger.

The pressed area of the tablet sheet differs when pressed with a stylus and with a finger. When the tablet sheet is pressed with the same pressure, the contact resistance $r_P$ at the pressed position differs with the finger and the stylus. Thus, either one of the absolute output mode and the relative output mode can be chosen by pressing the tablet sheet with the stylus or finger.

According to a fourth aspect of the present invention, the mode of operation for the output data generating facilities is chosen through utilization of a difference between contact resistance values $r_P$ by pressing the tablet sheet with two kinds of styluses having tablet contact portions of different curvatures.

The pressed area of the tablet sheet differs with curvatures of tablet contact portions of styluses. When the tablet sheet is pressed by styluses with the same pressure, the contact resistance $r_p$ at the pressed position differs. Hence, the absolute and the relative output mode can selectively be used by changing the two kinds of styluses.

According to a fifth aspect of the present invention, the mode of operation for the output data generating facilities is chosen according to the contact resistance value $r_p$ at the tablet-pressed position when the application of the pressure to the tablet sheet is detected.

In the case where the output data generating facilities is in the absolute value output mode when the tablet sheet is being pressed, the cursor moves from the position where the pressure was removed to the position corresponding to that where the tablet sheet was pressed again, whereas in the relative value output mode, the cursor will not move when the tablet sheet is pressed. Accordingly, by pressing the tablet sheet again after once stopping, it is possible to select the mode, according to the contact resistance value $r_p$ at the tablet-pressed position, to move the cursor to the position corresponding to the pressed-position or keep on cursor movement control despite temporary discontinuation of pressing the tablet sheet.

DESCRIPTION OF THE PREFERRED EMBODIMENTS

Figure 1:
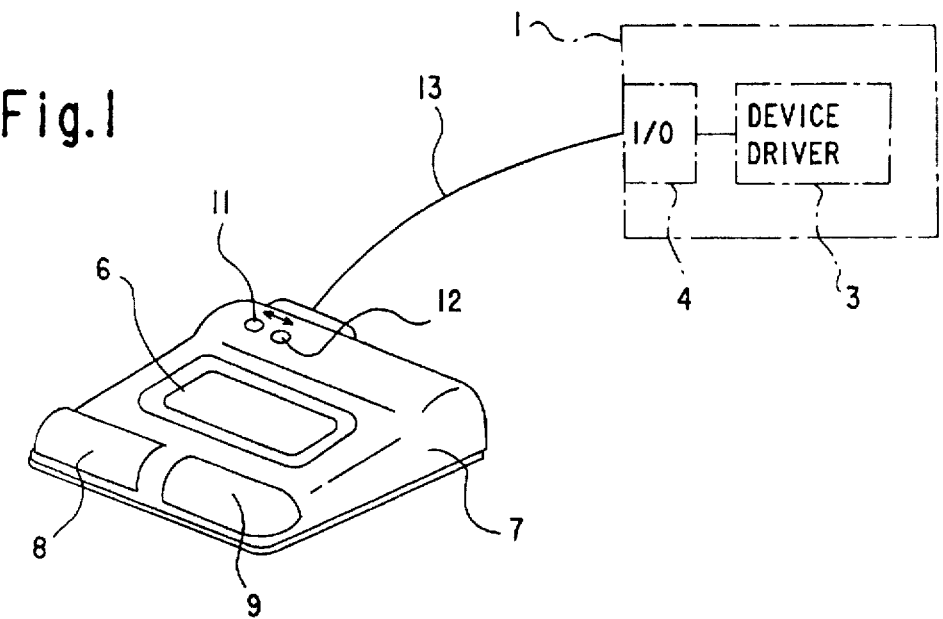
FIG. 1 is a perspective view of a touch pad 7 which is the pressure sensitive resistor tablet coordinate input unit according to an embodiment of the present invention.

With reference to the accompanying drawings, an embodiment of the present invention will hereinafter be described, in which the parts corresponding to those in the prior art example are identified by the same reference numerals.

FIG. 1 illustrates in perspective, a touch pad 7 which is a pressure sensitive resistor tablet coordinate input device according to an embodiment of the present invention. The touch pad 7 has a flat input surface formed by a tablet sheet 6. As shown, there are provided in the forward portion of the touch pad 7, a pair of left and right push-button switches 8 and 9 corresponding to switches of the conventional mouse. Mounted on the touch pad 7 in a backward portion thereof, are two light emitting elements 11 and 12 for displaying the mode of the touch pad 7.

The touch pad 7 is connected to a PC 1 via a cable 13 connected to the back of the PC 1. The touch pad 7 outputs absolute output data $(X_n, Y_n)$ to a device driver 3 via an I/O port 4 of the PC 1.

Figure 2:
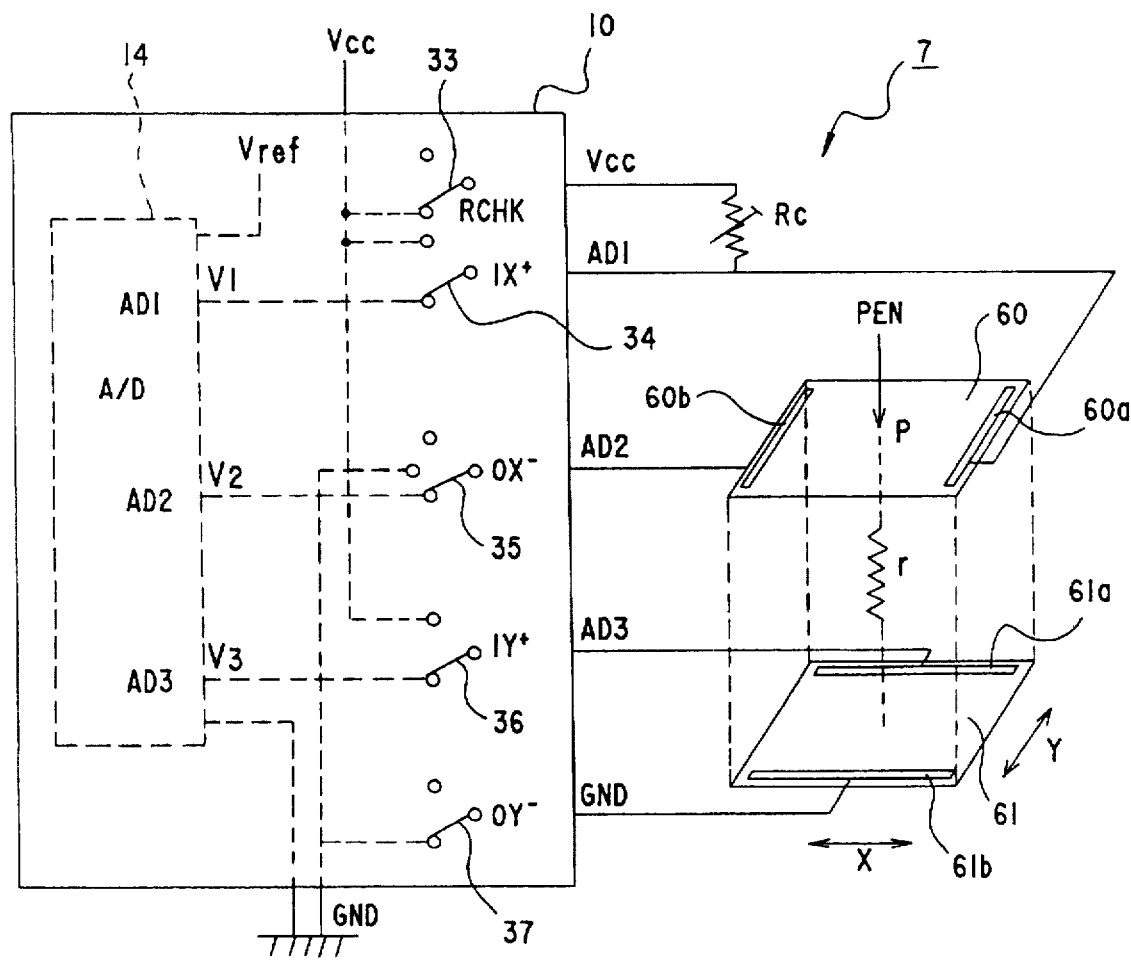
FIG. 2 is a circuit diagram of the touch pad 7 shown in FIG. 1.

FIG. 2 illustrates the circuit configuration of the touch pad 7, in which a microcomputer 10 has an AD converter 14 built-in. The AD converter 14 has three input terminals AD1, AD2 and AD3 and adapted to be capable of detecting potential at the respective input terminals at the same time.

The microcomputer 10 has five input/output terminals RCHK, IX$^+$, OX$^-$, IY$^+$ and OY$^-$, to which electronic switches 33 to 37 are connected for switching the connections of these terminals to internal circuits. The electronic switches 33 to 37 individually operate under the control of a switch control circuit 15 of the microcomputer 10 to switch between the above-mentioned terminals and the internal circuits of the microcomputer 10 as described later on.

The tablet sheet 6 is composed of a pair of opposed X- and Y-coordinate resistance sheets 60 and 61 coated uniformly all over the inner surfaces thereof with resistance layers and slightly spaced apart by dot-like insulating spacers (not shown) printed on opposed outer surfaces thereof.

As shown, the X-coordinate resistance sheet 60 has X-side positive and negative electrodes 60a and 60b formed thereon along opposite marginal edges in the X-direction. The positive electrode 60a is connected to the terminal IX$^+$ of the microcomputer 10 and the terminal RCHK via a variable resistor $R_C$ that serves as a reference resistor. The negative electrode 60b is connected to the terminal OX$^-$ of the microcomputer 10. The resistance value $r_C$ of the reference resistor $R_C$ is a predetermined value so adjusted as to allow ease in computing the contact resistance value $r_p$ of the tablet sheet 6 as described later on.

Similarly, the Y-coordinate resistance sheets 61 has Y-side positive and negative electrodes 61a and 61b formed thereon along opposite marginal edges in the Y-direction. The positive electrode 61a is connected to the terminal IY$^+$ of the microcomputer 10 and the negative electrode 61b the terminal OY$^-$ of the microcomputer 10.

Figure 4:
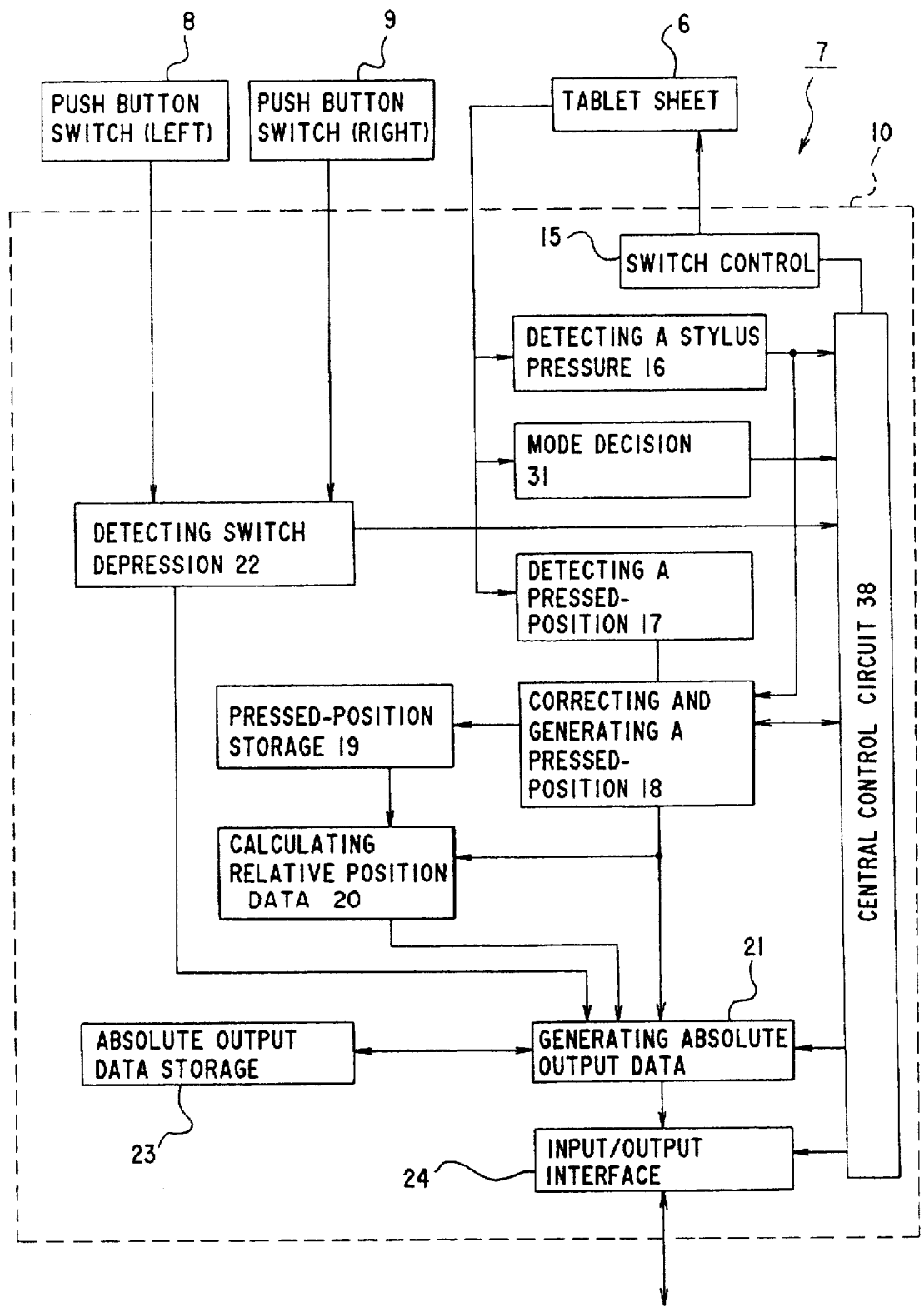
FIG. 4 is a block diagram illustrating the configuration of the touch pad 7.

FIG. 4 illustrates in block form the configuration of the touch pad 7. Connected to the tablet sheet 6, composed of the X- and Y-coordinate resistance sheets 60 and 61, are a stylus pressure detecting circuit 16, a mode discriminating circuit 31, and a pressed-position detecting circuit 17, which monitor the pressed state of the tablet sheet 6 when the touch pad 7 is in a stylus pressure detection mode, in a contact resistance detection mode, and in X- and Y-coordinate detection modes, respectively.

Referring now to FIG. 2, the operations of these circuits will be described.

The stylus pressure detecting circuit 16 monitors, for example, the potential of the X-coordinate resistance sheet 61 of the tablet sheet 6 and detects the application of stylus pressure and its removal from potential variations which are caused when the X-coordinate resistance sheet 61 comes into and goes out of contact with the Y-coordinate resistance sheet 61. In the stylus pressure detection mode, the terminal RCHK$^+$ in FIG. 2 is connected via the switch 33 to the power supply $V_{CC}$ to apply therefrom a reference detecting voltage $V_{CC}$ to the X-coordinate resistance sheet 60 via a reference resistor $R_C$, while at the same time the terminal IX$^+$ is connected to the input terminal AD1 of the AD converter 14 so as to detect the potential of the X-coordinate resistance sheet 60. Further, the input/output terminal OY$^-$ is connected via the switch 37 to a grounding terminal to keep the Y-coordinate resistance sheet 61 at the ground level.

While no pressure is being applied to the tablet sheet 6, no current flows across the resistance sheets 60 and 61, so that no voltage drop occurs across the reference resistor $R_C$, holding the terminal IX$^+$ at the potential of the power supply $V_{CC}$.

When the tablet sheet 6 is pressed in this state, a current flows from the X-coordinate resistance sheet 60 to the Y-coordinate resistance sheet 61 and the potential at the terminal IX+ drops accordingly. By comparing this potential with a stylus pressure detecting threshold value $V_T$, it is detected whether the tablet sheet 6 is being pressed or not.

Upon detection of the pressing of the tablet sheet 6 in the stylus pressure detection mode, the touch pad 7 enters the contact resistance detection mode and detects the contact resistance $r_P$ at the tablet-pressed position P. The mode discriminating circuit 31 selects the mode of operation of output data generating facilities 21 on the basis of the contact resistance value $r_P$ at the tablet-pressed position P.

In the contact resistance detection mode, the electronic switches 33 to 37 are operated under the control of the switch control circuit 15 to connect respective input/output terminals of the microcomputer 10 to internal circuits. That is, the terminal RCHK$^+$ is connected via the switch 33 to the power supply $V_{CC}$ to apply therefrom the reference detecting voltage $V_{CC}$ to the positive electrode 60a of the X-coordinate resistance sheet 60 via the variable resistor $R_C$. The input/output terminals IX$^+$, OX$^-$ and IY$^+$ are connected to the input terminals AD1, AD2 and AD3 of the AD converter 14 via the switches 34, 35 and 36, respectively, to detect potentials at the positive and negative electrodes 60a and 60b of the X-coordinate resistance sheet 60 and the positive electrode of the Y-coordinate resistance sheet 61. The remaining input/output terminal OY$^-$ is connected via the electronic switch 37 to the grounding terminal to keep the negative electrode 61b of the Y-coordinate resistance sheet 61 at the ground level.

Figure 3:
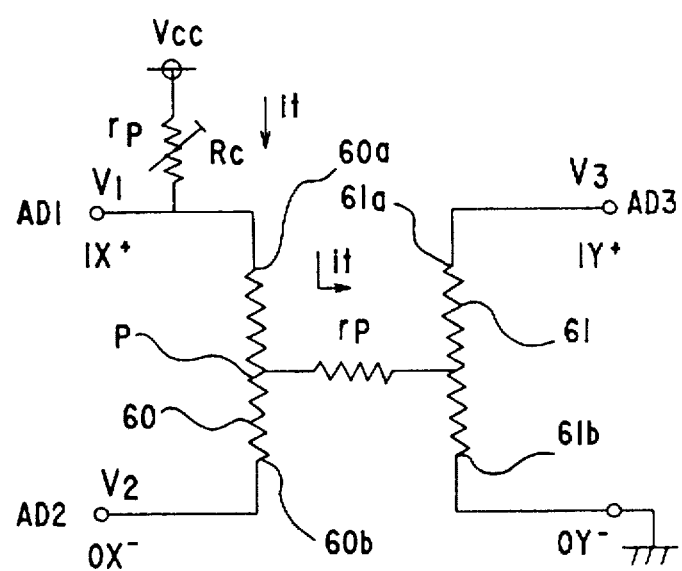
FIG. 3 is an equivalent circuit of the touch pad 7.

FIG. 3 is an equivalent circuit diagram of the touch pad 7 in the contact resistance detection mode. As shown, when the X-coordinate resistance sheet 60 is pressed, a current (it) flows therefrom via a contact resistance to the Y-coordinate resistance sheet 61 at the position P where the resistance sheet 60 is being pressed. At this time, the AD converter 14 is connected to each of the input/output terminals IX$^+$, OX$^-$ and IY$^+$ and, if minute currents toward them are neglected, the current (it) equally flows through the variable resistor $R_C$ and the contact resistance $r_P$.

Letting potential differences across the two resistors be represented by first and second potential differences $V_A$ and $V_B$, respectively, and the resistance value of the variable resistor $R_C$ as a reference resistor by $r_C$, the contact resistance $r_P$ can be detected by $r_P = r_C * V_B / V_A$ based on the relationship $V_A / r_C = V_B / r_P$.

As is evident from FIG. 3, the first potential difference $V_A$ and the second potential difference $V_B$ can be calculated from the predetermined reference detecting voltage $V_{CC}$ and a potential $V_1$ at the input terminal AD1 of the AD converter 14 and from potentials $V_2$ and $V_3$ at the input terminals AD1 and AD2 of the AD converter 14, so that the contact resistance value $r_P$ can be computed by $r_P = r_C * V_B / V_A$ in the mode selector circuit.

The computation of the contact resistance value $r_P$ is free from the current that flows in this mode. That is, even if the current (it) flowing across the resistance sheets 60 and 61 varies with a change in the position of contact $(x_P, y_P)$ between them, the contact resistance $r_P$ can be detected independently of the current, and the contact resistance $r_P$ can be detected as a parameter completely independent of the X- and Y-coordinates $(x_P)$ and $(y_P)$ of the contact position P. Accordingly, as long as the tablet sheet 6 is pressed under the same conditions, the resistance value $r_P$ will remain unchanged regardless of the tablet-pressed position. Conversely, by changing the contact resistance value $r_P$ by changing the conditions for pressing the tablet sheet, the mode of operation of the output data generating facilities 21 can be selected. In this embodiment, the boundary value between the contact resistance value $r_{1P}$ by pressing with the stylus and the contact resistance value $r_{2P}$ by pressing with a finger is set at $r_{TP}$. When the contact resistance value $r_P$ is larger than the boundary value $r_{TP}$, the mode decision circuit 31 construes it as the contact resistance value $r_{2P}$ by pressing with the finger and supplies a central control circuit 38 with a mode decision signal indicating the relative value output mode. When the contact resistance value $r_P$ is smaller that the boundary value $r_{TP}$, the mode decision circuit 31 construes it as the contact resistance value $r_{1P}$ by pressing with the stylus and supplies the central control circuit 38 with a mode decision signal indicating the absolute value output mode.

When the application of the stylus pressure is detected and the mode decision signal is output, the touch pad 7 goes into the X- and Y-coordinate detection modes and detects the tablet-pressed position in the pressed-position detecting circuit 17. The detection of the X- and Y-coordinates of the tablet-pressed position P is carried out by forming a potential gradient in the X- and Y-coordinate resistance sheets 60 and 61 alternately with each other.

In the X-coordinate detection mode, the input terminal IX$^+$ is connected via the electronic switch 34 to the power supply $V_{CC}$ to feed therefrom the reference detecting voltage $V_{CC}$ to the positive electrode 60a of the X-coordinate resistance sheet 60 through the terminal IX$^+$, while at the same time the input/output terminal OX$^-$ is grounded via the electronic switch 35 to ground the negative electrode 60b of the X-coordinate resistance sheet 60, forming therein a uniform potential gradient.

On the other hand, the input/output terminal OY$^-$ connected to the Y-side negative electrode 61b is disconnected therefrom by the electronic switch 37 to prevent a current flow to the Y-coordinate resistance sheet 61 from its position of contact with the X-coordinate resistance sheet 60, while at the same time the input/output terminal IY$^+$ is connected via the electronic switch 36 to the input terminal AD3 of the AD converter 14, thereby detecting the potential at the pressed position P via the positive electrode 61a of the Y-coordinate resistance sheet 61.

Since the uniform potential gradient is generated in the X-coordinate resistance sheet 60, the potential $V_{xP}$ detected at the input terminal AD3 of the AD converter 14 can be used to compute and detect the X-coordinate $(x_P)$ of the contact position P by the pressed-position detecting circuit 17.

After the detection of the X-coordinate, the touch pad 7 is similarly put in the Y-coordinate detection mode to detect the Y-coordinate. That is, the electronic switches 36 and 37 are operated to feed the reference detecting voltage $V_{CC}$ to the positive electrode 61a of the Y-coordinate resistance sheet 61 and ground the negative electrode 61b, generating a uniform potential gradient in the Y-coordinate resistance sheet 61. Further, the electronic switch 34 connected to the negative electrode 60b of the X-coordinate resistance sheet 60 is turned off to prevent a current flow thereto from its position P of contact with the Y-coordinate resistance sheet 61 and the input/output terminal IX$^+$ connected to the X-side positive electrode 60a is connected via the electronic switch 35 to the input terminal AD1 of the AD converter 14 to detect the potential at the contact position P from the X-side positive electrode 60a.

As is the case with the detection of the X-coordinate, the Y-coordinate $(y_P)$ of the contact position P is detected by the pressed-position detecting circuit 17 by computation from the potential $V_{yP}$ detected at the input terminal AD1 of the AD converter 14.

Thereafter, the touch pad 7 is returned to the stylus pressure detection mode and unless it is decided that the stylus is no longer pressed to the tablet sheet 6, the touch pad 7 repeatedly operates in the contact resistance detection mode and the X- and Y-coordinate detection modes, deciding the mode of operation of the output data generating facilities 21 and detecting the X- and Y-coordinates $(x_P)$ and $(y_P)$ of the contact position P.

As depicted in FIG. 4, the pressed-position detecting circuit 17 outputs the thus periodically detected pressed-position data $(x_n, y_n)$ to a pressed-position data correcting and generating circuit 18. The pressed-position data correcting and generating circuit 18 is connected to the stylus pressure detecting circuit 16, the pressed-position detecting circuit 17 and the central control circuit 38. After the detection of the application of the stylus pressure to the tablet sheet 6 by the stylus pressure detecting circuit 16, the circuit 18 correlates a plurality of pieces of pressed-position data (x,y) input thereinto from the pressed-position detecting circuit 17 and cancels abnormal pieces of pressed-position data (x,y), generating pressed-position data $(x_n, y_n)$.

The output of the pressed-position data correcting and generating circuit 18 is connected to the pressed-position data storage circuit 19. Upon each generation of absolute output data $(X_n, Y_n)$ by the absolute output data generating circuit 21 described later, the storage circuit 19 stores the pressed-position data $(x_n, y_n)$ provided from the pressed-position data correcting and generating circuit 18 at that time.

A relative position data calculating circuit 20 is one that, upon each direct input thereinto of the pressed-position data $(X_n, y_n)$ from the pressed-position data correcting and generating circuit 18, calls up from the pressed-position data storage circuit 19 the pressed-position data $(x_{n-1}, y_{n-1})$ stored previously when the absolute output data $(X_{n-1}, Y_{n-1})$ was generated and uses the difference between the two pieces of data to calculate relative position data $k(x_n - x_{n-1}, y_n - y_{n-1})$. Upon each input of new pressed-position data $(x_n, y_n)$ from the pressed-position data correcting and generating circuit 18 into the relative position data calculating circuit 20, the relative position data $k(x_n - x_{n-1}, y_n - y_{n-1})$ is calculated and fed to the absolute output data generating circuit 21.

The left and right push-button switches 8 and 9 mounted on the touch pad 7 are each connected to a switch depression detecting circuit 22 to detect the depression of the switch. The switch depression detecting circuit 22 is connected to the central control circuit 38 and the absolute output data generating circuit 21 and outputs switch data representing the detected state of operation of each switch.

The push-button switches 8 and 9 correspond to switches mounted on the conventional mouse 2, and when the switches are manipulated, absolute output data is produced which is the same as that generated by the manipulation of the switches on the mouse. The operation unique to the mouse, such as drag, can be done by manipulating the push-button switch 8 corresponding to the left switch of the mouse.

The central control circuit 38 is connected to the mode decision circuit 31, the stylus pressure detecting circuit 16, the output side of the switch depression detecting circuit 22 and the pressed-position data correcting and generating circuit 18. The central control circuit 38 outputs to the absolute output data generating circuit 21 the mode select signal fed from the mode decision circuit 31 and the stylus pressure detection signal from the stylus pressure detecting circuit 16 which represents the pressing of the tablet sheet 6.

The absolute output data generating circuit 21, which is output data generating means, generates absolute output data $(X_n, Y_n)$ of the format shown in Table 1 from the switch data and the pressed-position data $(x_n, y_n)$ or relative position data $(x_n - x_{n-1}, y_n - y_{n-1})$. In Table 1 absolute values, each indicating the destination of the cursor movement on the PC display 5 in a data format composed of five bytes each consisting of 10 bits, are given as coordinate values X and Y in the binary notation.

TABLE 1

| | D7 | D6 | D5 | D4 | D3 | D2 | D1 | D0 |
|---|---|---|---|---|---|---|---|---|
| First Bite | P | 1 | F | 0 | 0 | 0 | S1 | S0 |
| Second Bite | P | 0 | X5 | X4 | X3 | X2 | X1 | X0 |
| Third Bite | P | 0 | X11 | X10 | X9 | X8 | X7 | X6 |
| Fourth Bite | P | 0 | Y5 | Y4 | Y3 | Y2 | Y1 | Y0 |
| Fifth Bite | P | 0 | X11 | X10 | X9 | X8 | X7 | X6 |

In Table 1, P is a parity bit and F is an effective area designating bit. The effective area designating bit "0" indicates that the tablet sheet 6 is being pressed within an effective coordinate readout range, whereas "1" indicates that the tablet sheet 6 is not being pressed within the effective coordinate readout range. That is, when the bit F is "0," data is handled as effective data. X0 to X11 (12 bits) are bits that represent the abscissa value in binary notation, and Y0 to Y11 (12 bits) are bits that represent the ordinate value in binary notation. The smaller the numerical value, the less significant, and X0 and $Y_0$ are the least significant bits, respectively.

S0 and S1 are bits of the switch data representing the state of operation of each of the push-button switches 8 and 9. For example, when they are depressed, data of the corresponding bits S0 and S1 will change from "0" to "1."

Upon each application thereto of the mode select signal from the central control circuit 38, the absolute output data generating circuit 21 switches between the absolute value output mode and the relative value output mode. In the absolute value output mode, the absolute output data generating circuit 21 inputs thereinto directly from the pressed-position data correcting and generating circuit 18 the pressed-position data $(x_n, y_n)$ composed of 12 bits for each of the X and Y coordinates and generates the absolute output data $(X_n, Y_n)$ using the input data as two pieces of data composed of the bits X0 to X11 and Y0 to Y11, respectively.

In the relative value output mode, the absolute output data generating circuit 21 adds the relative position data $(x_n - x_{n-1}, y_n - y_{n-1})$ output from the relative position data calculating circuit 20 to the immediately preceding absolute output data $(X_{n-1}, Y_{n-1})$ to generate new absolute output data $(X_n, Y_n)$. That is, the data $(x_n - x_{n-1})$ is added to the coordinate value $X_{n-1}$ expressed by the 12 bits X0 to X11 in the immediately preceding absolute output data $(X_{n-1}, Y_{n-1})$, by which is generated the coordinate value $X_n$ represented by the bits X0 to X11 in the new absolute output data $(X_n, Y_n)$. Likewise, the data $(y_n - y_{n-1})$ is added to the coordinate value $Y_{n-1}$ expressed by the 12 bits Y0 to Y11 in the immediately preceding absolute output data $(X_{n-1}, Y_{n-1})$, by which is generated the coordinate value $Y_n$ represented by the bits Y0 to Y11 in the new absolute output data $(X_n, Y_n)$.

To generate the data in the relative value output mode, the absolute output data generating circuit 21 is connected to an absolute output data storage circuit 23, which stores therein the absolute output data $(X_n, Y_n)$ upon each generation thereof. In the generation of new absolute output data $(X_n, Y_n)$ in the relative value output mode, the absolute data generating circuit 21 calls up the immediately preceding absolute output data $(X_{n-1}, Y_{n-1})$ stored in the storage circuit 23.

Incidentally, in the relative value output mode, the absolute output data $(X_n, Y_n)$ is output only when the pressed-position data $(x_n, y_n)$ is continuously input during the input of the stylus pressure detecting signal, that is, only when shifting the position of pressing the tablet sheet 6 while pressing it. While no pressure is applied to the tablet sheet 6 and immediately after the detection of the stylus pressure, the pressed-position data $(x_n, y_n)$ is merely stored in the storage circuit 10 and the absolute output data $(X_n,Y_n)$ is not output. Accordingly, the absolute output data output upon removal of the stylus pressure to the tablet sheet 6 used as the immediately preceding absolute output data $(X_{n-1},Y_{n-1})$, with the result that the cursor moves in a new press-shift direction from the position where the stylus pressure was removed.

The absolute output data $(X_n,Y_n)$ generated by the absolute output data generating circuit 21 is provided as send data to the PC via an I/O interface 24 which is data output facilities. The circuits surrounded by the broken lines in FIG. 4 are integrated as a one-chip microcomputer together with the central control circuit 38.

Figure 5:
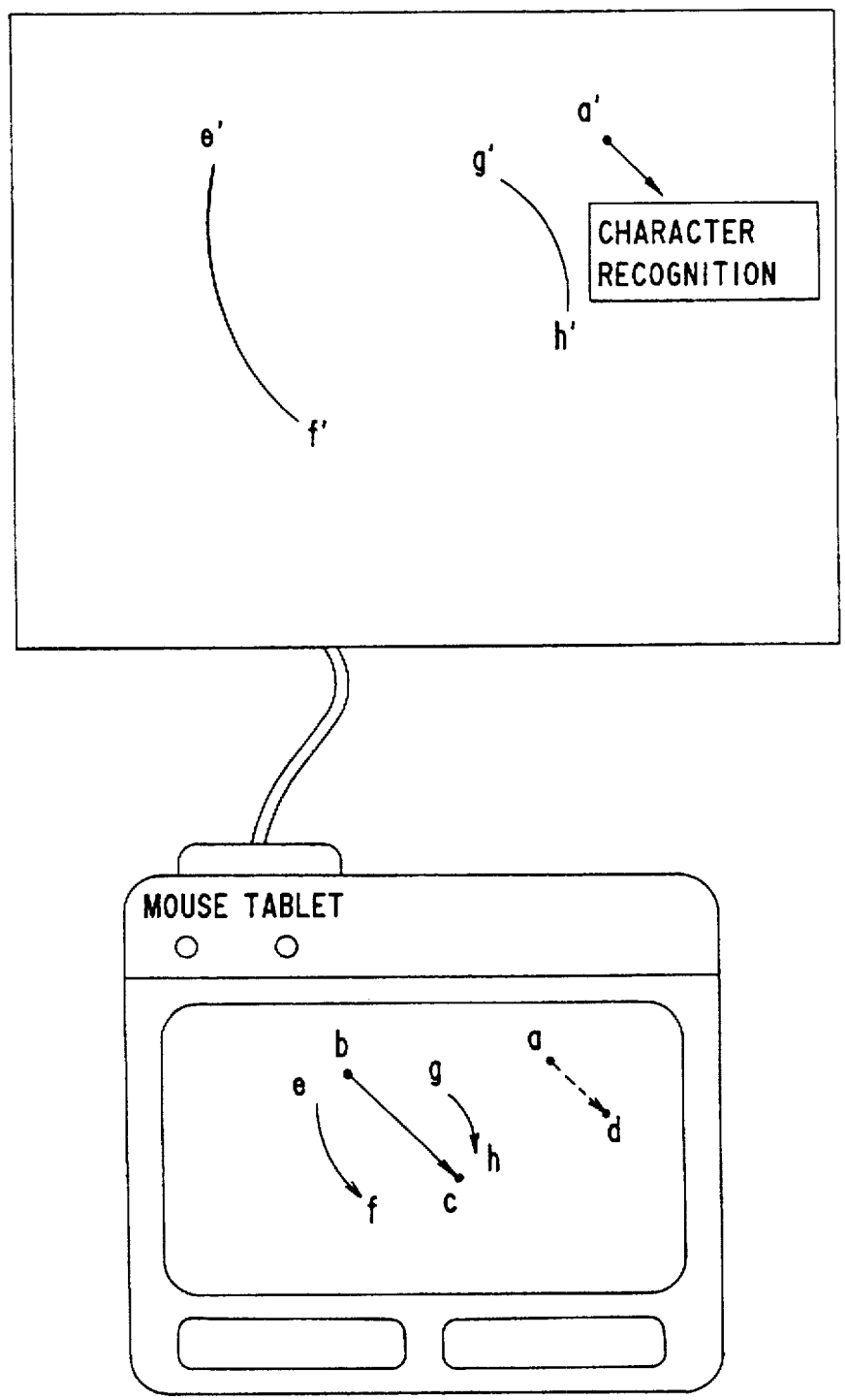
FIG. 5 is an explanatory diagram showing the relationship between the operation of the touch pad 7 and the cursor movement on a display 5.

Next, a description will be given, with FIGS. 4 and 5, of the operation of the touch pad 7 of such a configuration as described above. FIG. 5 is an explanatory diagram showing the relationship between the manipulation of the touch pad 7 and the cursor movement on the PC display 5.

Assume that, as shown in FIG. 5, the cursor at "a'" on the display 5 is moved to an icon labeled with "Character Recognition" to cause the PC 1 to perform character recognition. Based on absolute output data (X0,Y0) corresponding to the position "a'" output in response to the previous manipulation, the cursor is now being positioned at the upper right corner of the display 5, but the cursor movement can be controlled by pressing the tablet sheet 6 with a finger while shifting it from the position "b" to "c" at substantially the center of the sheet 6. When the tablet sheet 6 is pressed at the position "b," the pressure applied thereto is detected and, at the same time, the contact resistance value $r_P$ by pressing is detected. Since the tablet sheet 6 is being pressed with the finger, the contact resistance value $r_P$ is greater than the afore-mentioned boundary value $r_{TP}$. Hence, the mode decision circuit 31 decides that the mode of operation is the relative value output mode, and the absolute output data generating circuit 21 goes into the relative value output mode accordingly.

On the other hand, pressed-position data on "b" is detected by the pressed-position detecting circuit 17, but since the stylus pressure has just been detected, the pressed-position data $(x_0,y_0)$ is merely stored in the pressed-position data storage circuit 19 and the absolute output data $(X_n,Y_n)$ is not output. By the press-shift of the finger toward the position "c," new pressed-position data $(x_1,y_1)$ is detected and the relative position data calculating circuit 20 calculates relative position data $(x_1-x_0,y_1-y_0)$ from the immediately preceding pressed-position data $(x_0,y_0)$ and the pressed-position data $(x_1,y_1)$ newly fed from the pressed-position data correcting and generating circuit 18.

Since the absolute output data generating circuit 21 is in the relative value output mode, it adds the relative position data $(x_1-x_0,y_1-y_0)$ to the immediately preceding absolute output data $X_{n-1},Y_{n-1})$ to obtain new absolute output data $(X_1,Y_1)$. The immediately preceding absolute output data was not generated when the tablet sheet 6 was pressed at the position "b," and hence it is the absolute output data $(X_0,Y_0)$ corresponding to the position "a'." That is, X1 becomes $X_0+(x_1-x_0)$ and Y1 becomes $Y_0+(y_1-y_0)$, so that the cursor moves from the position "a'." Thus, by shifting the finger from the position "b" toward "c" at the center of the tablet sheet 6 while pressing the finger thereto, it is possible to control the cursor to move from the position "a'" toward the icon labeled with "Character Recognition." In this movement control, the cursor can be continuously moved even if the pressing of the tablet sheet 6 is temporarily stopped.

Upon depression of the push-button switch 8 after moving the cursor to the icon labeled with "Character Recognition," the PC 1 executes a character recognition processing program and goes into a character input waiting state. The character input is provided by writing a desired character on the tablet sheet 6 with a stylus.

Assuming that a character "\" is input by the stylus and the tablet sheet 6, the stylus is press-shifted on the tablet sheet 6 from the position "e" to "f." When the tablet sheet 6 is pressed at the position "e," it is detected together with the contact resistance value $r_P$. Since the tablet sheet 6 is pressed by the stylus, the area of contact between the resistance sheets 60 and 6a is smaller than in the case of being pressed by a finger and the contact pressure per unit area increases accordingly and the contact resistance $r_P$ becomes smaller than the boundary value $r_{TP}$.

Hence, the absolute value output mode is decided upon by the mode decision circuit 31 and the absolute output data generating circuit 21 is put in the absolute value output mode.

On the other hand, the pressed-position data $(x_0,y_0)$ at the position "e" is detected by the pressed-position detecting circuit 17 and the absolute value output data generating circuit 21 uses the pressed-position data $(x_0,y_0)$ intact to generate the absolute output data $(X_0,Y_0)$. As a result, the cursor at the icon "Character Recognition" is displayed at a position "e'" on the display 5 which corresponds to the pressed-position data $(x_0,y_0)$. Likewise, when the stylus is moved from the position "e" to "f," absolute output data $(X_n,Y_n)$ containing the pressed-position data $(X_n,Y_n)$ at the pressed position is output and the cursor moves from the position "e'" to "f'" in correspondence with the pressed position. Removing pressure from the tablet sheet 6 at the position "f" and pressing it again at a position "g," absolute output data $(X_n,Y_n)$ containing pressed-position data $(x_n,y_n)$ at the position "g" is output and the cursor moves to a position "g'" corresponding to the position "g." That is, even if the tablet sheet 6 is pressed at the position "g," after the suspension of the cursor movement by the removal of pressure at the position "f," the cursor will not move again from the position "f," so that a character with separate strokes can be input by a sequence of steps which do not involve any particular input operations.

Incidentally, the PC 1 judges that the press-shift of the stylus from the position "e" to "f" is a stroke of the character being input because the effective area designate bit F is "0" and that the shift from the position "f" to "g" is a mere cursor movement because the bit F is "0." In response to the press-shift from the position "g" to "h" the cursor similarly moves from the position "g'" to "h'."

To indicate the mode of operation of the absolute output data generating circuit 21, the light emitting elements 11 and 12 stay lit up during the relative value output mode and during the absolute value output mode, respectively.

The pressure sensitive resistance tablet coordinate input device according to the first embodiment described above provides the absolute output data $(X_n,Y_n)$ in the same format as that used for the tablet, but since the device driver, which is connected to the mouse, is to move the cursor on the basis of the relative output data $(X'_n,Y'_n)$, it cannot be connected to the PC 1 in a manner to be compatible with the mouse.

Figure 6:
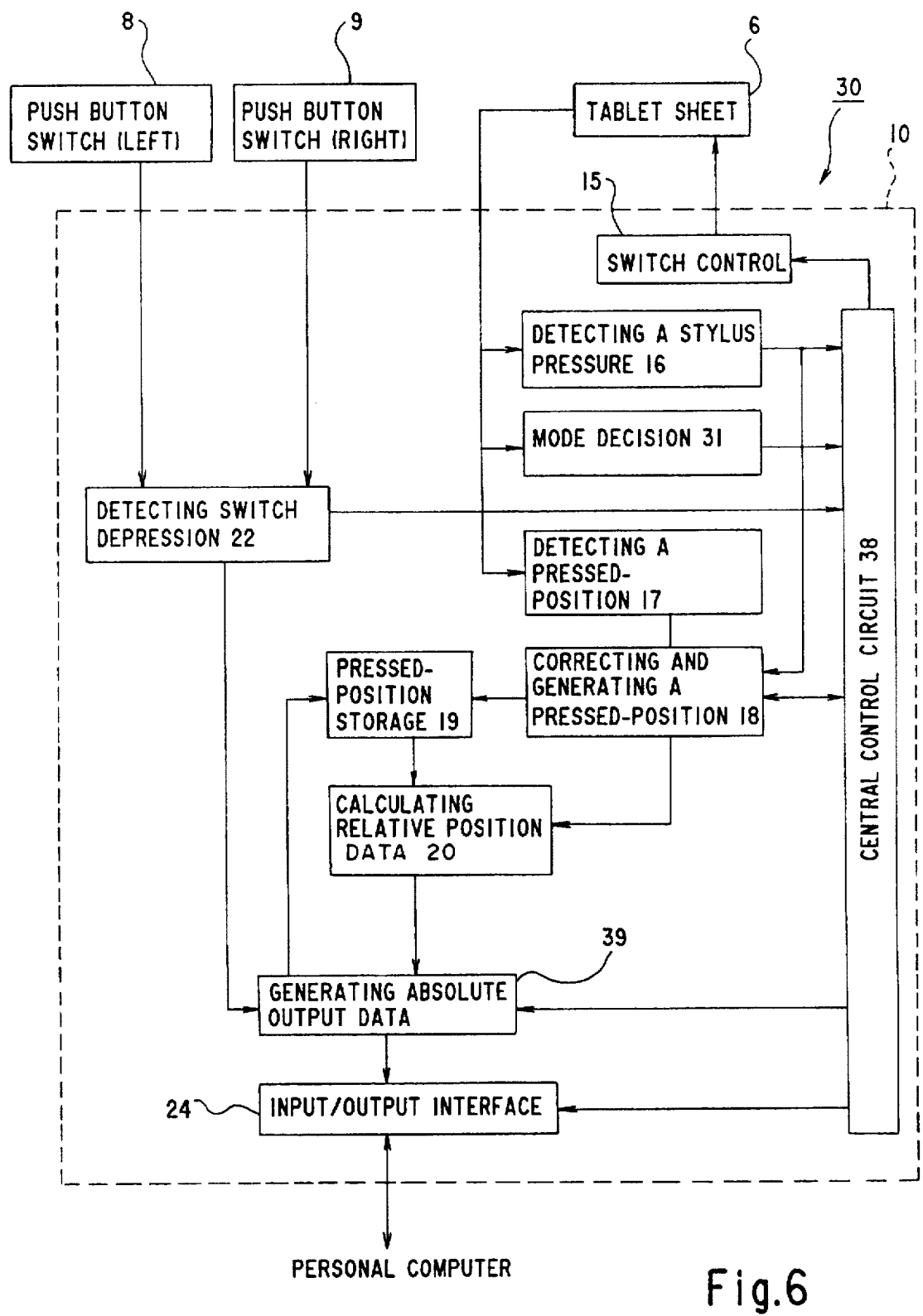
FIG. 6 is a block diagram of a touch pad 30 according to another embodiment of the present invention.
Figure 7:
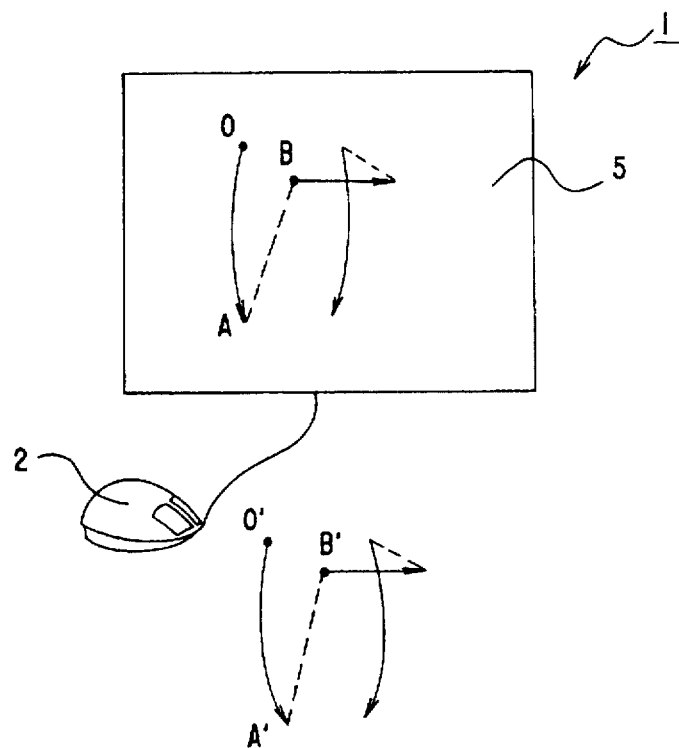
FIG. 7 is an explanatory diagram showing the relationship between the operation of a conventional mouse 2 and the cursor movement on the display 5.
Figure 8:
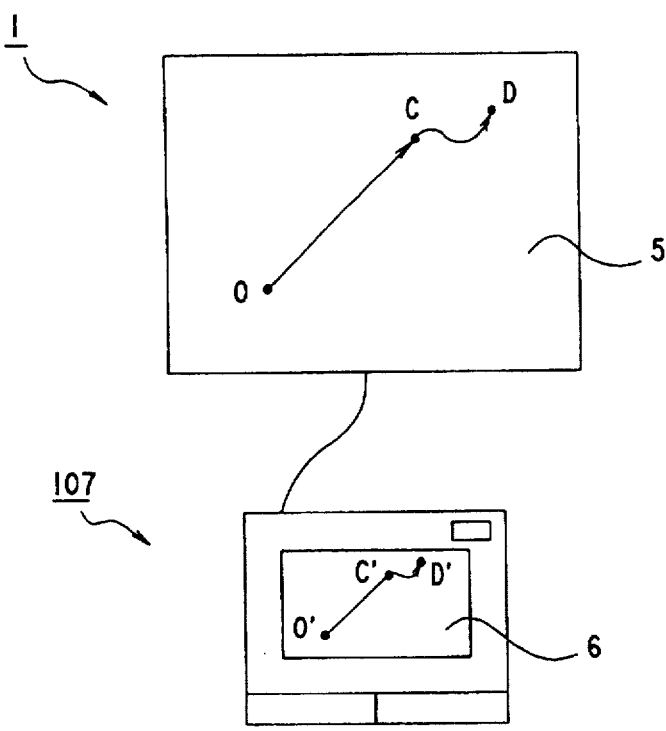
FIG. 8 is an explanatory diagram showing the relationship between the operation of a conventional touch pad 7 and the cursor movement on the display 5.

FIG. 6 illustrates in block form a second embodiment of the pressure sensitive resistance tablet coordinate input device according to the present invention, which is designed to provide the relative output data $(X'_n,Y'_n)$ of the same format as that for the mouse. In FIG. 6 the parts corresponding to those in the first embodiment are identified by the same reference numerals and their description will not be repeated.

As is evident from comparison with the touch pad 7 of the first embodiment, the touch pad 30 of this embodiment differs therefrom in that the absolute output data storage circuit 23 is omitted, that the output data generating facilities is connected to the pressed-position data storage circuit 19 in place of the pressed-position data correcting and generating circuit 18 and that the output data generating facilities is a relative output data generating circuit 39.

Upon each application thereto of a mode select signal from the central control circuit 38, the relative output data generating circuit 39 switches between the absolute value output mode and the relative value output mode.

When the relative output data generating circuit 39 is in the absolute value output mode, it generates relative output data $(X'_n, Y'_n)$ from relative position data $(x_n - x_{n-1}, y_n - y_{n-1})$ calculated from the difference between pieces of pressed-position data $(x_n, y_n)$ continuously input thereinto at all times. That is, upon newly detecting the stylus pressure to the tablet sheet 6 after it was temporarily removed, relative position data $(x_1 - x_0, y_1 - y_0)$ calculated from the difference between pressed-position data $(x_0, y_0)$ at the pressure-removed position and pressed-position data $(x_1, y_1)$ at the pressure-detected position are used to generate relative output data $(X'_1, Y'_1)$, which is fed to the PC 1. As a result, the amount of relative movement with no stylus pressure is provided to the PC 1, so that the cursor is controlled to apparently move to the position corresponding to the pressed position of the tablet sheet 6. For example, where the stylus pressure is removed from the tablet sheet 6 at the position "f" and is applied thereto again at the position "g," the cursor moves from the position "f" to "g'" as in the first embodiment.

On the other hand, while in the relative value output mode, the relative output data generating circuit 39 does not generate the relative output data $(X'_1, Y'_1)$ when the stylus is supplied with a new stylus pressure detection signal from the central control circuit 38. In other words, the pressed-position data $(x_{n-1}, y_{n-1})$ stored in the pressed-position data storage circuit, namely, the pressed-position data $(x_0, y_0)$ at the position where the stylus pressure applied to the tablet sheet 6 was removed therefrom, is rewritten to pressed-position data $(x_1, y_1)$ at the position where the pressure was newly detected, but since the relative output data $(X'_1, Y'_1)$ based on the relative position data $(x_1 - x_0, y_1 - y_0)$ is not created, the amount of relative movement with no stylus pressure is not fed to the PC 1. Unless the stylus pressure is detected, the same processing as in the absolute value output mode is done, and when supplied with new pressed-position data $(x_2, y_2)$ after further press-shift, the relative output data generating circuit 39 generates relative output data $(X'_2, Y'_2)$ based on relative position data $(x_2 - x_1, y_2 - y_1)$ and provides it to the PC 1. Thus, even if the stylus pressure to the tablet sheet 6 is once removed, the cursor moves from the pressure-removed position, so that the cursor movement can be controlled continuously.

As described above, according to the second embodiment of the invention, either the relative value output just like a mouse output or the absolute value output just like a tablet output can be selected in accordance with the content of each input operation, and hence the output data can be fed to the PC 1 in a format suitable for subsequent processing. Additionally, this mode selection can be made by pressing the tablet sheet 6 with either a stylus or finger. In other words, no particular operation or input facilities is needed.

While in the above the mode of operation of the output data generating facilities is selected by changing the contact resistance value $r_p$, depending on whether a finger or stylus is used to press the tablet sheet 6, the invention is not limited specifically thereto. It is possible to use any facilities which provide different resistance values, such as two kinds of styluses whose tip end portions of different curvatures, or the tablet sheet 6 may be pressed by a finger and a finger tip.

The pressure facilities may also be a single stylus or finger, in which the pressure applied to the tablet 6 needs only to be changed so that the contact resistance value $r_p$ is changed accordingly to select the mode of operation of the output data generating facilities.

In the above, upon each detection of the X- and Y-coordinates, the contact resistance value $r_p$ is detected and the mode of operation of the output data generating facilities is decided, but the invention is not limited specifically thereto. The mode of operation may also be changed by detecting the contact resistance value $r_p$ when the application of the stylus pressure to the tablet sheet 6 is newly detected or when the removal of the pressure is detected.

EFFECT OF THE INVENTION

As described above, according to the first aspect of the present invention, in the absolute value output mode the pressed-position data $(x_n, y_n)$ can be used intact as the absolute output data $(X_n, Y_n)$, so that the cursor can be moved to a desired position by pressing the tablet sheet only once at the position corresponding to the cursor destination. In the relative value output mode, since the relative position data $(x_n - x_{n-1}, y_n - y_{n-1})$ can be used to obtain the absolute output data $(X_n, Y_n)$, the press-shift operation of the stylus can be made on an arbitrary sheet. Whether to put the output data generating facilities in the absolute or relative value output mode can easily be selected only by changing the pressure to the tablet sheet 6 to change the contact resistance value $r_p$ at the pressed position. Accordingly, neither mode select switch nor mode switching operation is needed for the mode selection.

According to the second aspect of the invention, in the absolute value output mode, the relative output data $(X'_n, Y'_n)$ is generated from the relative position data $(x_n - x_{n-1}, y_n - y_{n-1})$ indicating the relative position while no pressure is applied to the tablet sheet 6, the cursor can be moved to a desired position simply by pressing the tablet sheet 6 at the position apparently corresponding to the cursor destination. In the relative value output mode, since the relative output data $(X'_n, Y'_n)$ is not created using the relative position data indicating the relative position while the pressure is not applied to the tablet sheet 6, control of the cursor movement can be continued from the current position of the cursor, even if the pressure to the tablet sheet 6 is once removed. Whether to put the output data generating facilities in the absolute or relative value output mode can easily be selected only by changing the pressure to the tablet sheet 6 to change the contact resistance value $r_p$ at the pressed position. Accordingly, neither mode select switch nor mode switching operation is needed for the mode selection.

According to the third and fourth aspect of the invention, the absolute or relative output mode can easily be selected by changing the contact resistance value $r_p$.

According to the fifth aspect of the invention, once the absolute value output mode or relative value output mode is selected according to the contact resistance value $r_p$ at the position where the tablet sheet 6 is pressed again after removing the pressure therefrom, it is possible to select whether to continue the cursor movement or to directly move the cursor to a predetermined position on the display, even if the pressure to the tablet sheet 6 is removed.

It will be apparent that many modifications and variations may be effected without departing from the scope of the novel concepts of the present invention.

What is claimed is:

1. A pressure sensitive resistor tablet coordinate input device which comprises:

a tablet sheet (6);

stylus pressure detecting means (16) for detecting an application of stylus pressure to said tablet sheet (6);

position detecting means (18) for generating pressed-position data $(x_n, y_n)$ indicating a position on said tablet sheet (6) where a stylus is being pressed;

storage means (19) for storing said pressed-position data $(x_n, y_n)$ at least until a next pressed-position data is generated;

output data generating means (21) for generating, from said pressed-position data $(x_n, y_n)$, absolute output data $(X_n, Y_n)$ for controlling a cursor movement on a display (5) of a personal computer (1); and data output means (24) for outputting said absolute output data $(X_n, Y_n)$ to said personal computer (1) and which controls said cursor movement on said display in response to an operation of pressing said tablet sheet (6);

wherein said output data generating means (21) can selectively be put in any one of an absolute value output mode, in which said output data generating means uses said pressed-position data $(x_n, y_n)$ as said absolute output data $(X_n, Y_n)$, and an relative value output mode, in which said output data generating means uses said absolute output data $(X_n, Y_n)$ obtained by adding immediately preceding absolute output data $(X_{n-1}, Y_{n-1})$ with relative position data $(x_n-x_{n-1}, y_n-y_{n-1})$ indicative of a relative shift amount of a stylus on said tablet sheet (6) before and after a current stylus press-shift operation is completed is completed; and wherein said output data generating means (21) generates said absolute output data in either one of said absolute value output modes and said relative value output mode selected in accordance with a contact resistance value $r_P$ at said position on said tablet sheet where said stylus is being pressed.

2. A pressure sensitive resistor tablet coordinate input device which comprises:

a tablet sheet (6);

stylus pressure detecting means for detecting an application of stylus pressure to a tablet sheet (6);

position detecting means for generating pressed-position data $(x_n, y_n)$ indicating the position on said tablet sheet (6) where said stylus is being pressed;

storage means (19) for storing said pressed-position data $(x_n, y_n)$ at least until a next pressed-position data is generated;

output data generating means (39) for computing relative position data $(x_n-x_{n-1}, y_n-y_{n-1})$ by comparing pieces of pressed-position data before and after a current stylus press-shift operation on said tablet sheet (6) and for generating, from said relative position data $(x_n-x_{n-1}, y_n-y_{n-1})$, relative output data $(X'_n, Y'_n)$ for controlling a cursor movement; and data output means (24) for outputting said relative output data $(X'_n, Y'_n)$ to a personal computer and which controls said cursor movement on a display of said personal computer in response to an operation of pressing said tablet sheet (6);

wherein when said stylus pressure applied to said tablet sheet (6) is detected again after said stylus pressure was once removed, said output data generating means (39) can selectively be put in any one of an absolute value output mode, in which said output data generating means computes said relative position data $(x_n-x_{n-1}, y_n-y_{n-1})$ by comparing pressed-position data $(x_{n-1}, y_{n-1})$ at a position where said stylus pressure to said tablet sheet was removed and pressed-position data $(x_n, y_n)$ at a position where said stylus pressure to said tablet sheet was detected again and generates said relative output data $(X'_n, Y'_n)$ from said computed relative position data $(x_n-x_{n-1}, y_n-y_{n-1})$, and a relative value output mode, in which said output data generating means nullifies said pressed-position data $(x_{n-1}, y_{n-1})$ at said position where said stylus pressure was removed from said tablet sheet and does not generate said relative output data $(X'_n, Y'_n)$; and wherein said output data generating means (39) generates said relative output data in either one of said absolute value output modes and said relative value output mode selected in accordance with a contact resistance value $r_P$ at said position on said tablet sheet where said stylus is being pressed.

3. The pressure sensitive resistance tablet coordinate input device of claims any one of 1 and 2, of said output data generating means (21), (39) is chosen by discriminating between a contact resistance value $r_{1P}$ by pressing said tablet sheet with said stylus and a contact resistance value $r_{2P}$ by pressing with a finger.

4. The pressure sensitive resistance tablet coordinate input device of any one of claims 1 and 2, wherein any one of said absolute value output mode and said relative value output mode of said output data generating means (21), (39) is chosen through utilization of a difference between contact resistance values $r_P$ by pressing said tablet sheet with a first kind of said stylus and a second kind of said stylus, each having tablet contact portions of different curvatures.

5. The pressure sensitive resistance tablet coordinate input device of any one of claims 1 and 2, wherein any one of said absolute value output mode and said relative value output mode of said output data generating means (21), (39) is chosen according to said contact resistance value $r_P$ at a position on said tablet sheet (6) where pressure thereto is detected.

6. The pressure sensitive resistance tablet coordinate input device of claim 3, wherein any one of said absolute value output mode and said relative value output mode of said output data generating means (21), (39) is chosen according to said contact resistance value $r_P$ at a position on said tablet sheet (6) where pressure thereto is detected.

7. The pressure sensitive resistance tablet coordinate input device of claim 4, wherein any one of said absolute value output mode and said relative value output mode of said output data generating means (21), (39) is chosen according to said contact resistance value $r_P$ at a position on said tablet sheet (6) where pressure thereto is detected.

* * * * *